(12) United States Patent
Mechtel et al.

(10) Patent No.: US 6,291,549 B1
(45) Date of Patent: *Sep. 18, 2001

(54) ANTIFOULING PAINTS

(75) Inventors: Markus Mechtel; Wolfgang Podszun, both of Köln; Karl-Heinz Kaesler, Leverkusen, all of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,711
(22) PCT Filed: Oct. 13, 1997
(86) PCT No.: PCT/EP97/05626
  § 371 Date: Apr. 19, 1999
  § 102(e) Date: Apr. 19, 1999
(87) PCT Pub. No.: WO98/17732
  PCT Pub. Date: Apr. 30, 1998

(30) Foreign Application Priority Data

Oct. 24, 1996 (DE) .............................. 196 44 225

(51) Int. Cl.[7] ...................................................... C08K 5/00
(52) U.S. Cl. .................................................... 523/122
(58) Field of Search .............................. 523/122

(56) References Cited

U.S. PATENT DOCUMENTS

| | | | |
|---|---|---|---|
| 4,561,981 | 12/1985 | Characklis | 210/696 |
| 4,769,398 | 9/1988 | Kanda et al. | 523/122 |
| 5,298,060 | 3/1994 | Harakal et al. | 106/15.05 |
| 5,332,428 | 7/1994 | Yoskioka et al. | 106/2 |
| 5,695,522 | 12/1997 | Taylor | 106/15.05 |

FOREIGN PATENT DOCUMENTS

| | | |
|---|---|---|
| 0 032 597 | 11/1983 | (EP) . |
| 95/32862 | 12/1995 | (WO) . |

OTHER PUBLICATIONS

Chemical Abstracts, vol. 84, No. 12, Mar. 22, 1976, Abstract No. 75808n.

*Primary Examiner*—Kriellion Sanders
(74) *Attorney, Agent, or Firm*—Joseph C. Gil; Richard E. L. Henderson

(57) ABSTRACT

Compositions containing (a) at least one organosiloxane and (b) at least one heavy-metal-free biocide. Antifouling compositions, antifouling coatings, and processes for making the same.

12 Claims, No Drawings

continues

ANTIFOULING PAINTS

BACKGROUND OF THE INVENTION

The invention relates to compositions for the production of antifouling coatings which comprise organopolysiloxanes as binder and biocides as active substance.

Antifouling coatings are used to protect articles against infestation, especially ships' hulls, screens, nets, constructions, quaysides, signalling equipment and articles which come into contact with sea water or brackish water.

Infestation growth is a severe problem especially in the case of ships, since, for example, the frictional resistance is increased and, as a consequence of the increased energy consumption and frequent spells in dry dock, the operating costs are significantly heightened. For this reason, antifouling coatings have long been used to prevent cases of infestation by algae, barnacles, tube worms, mussels or other marine organisms.

In this area it is possible to make a fundamental distinction between antifouling coatings which include biocides and those which are biocide-free.

Biocide-free antifouling coatings possess anti-adhesion properties, i.e. the intention is to prevent physically the attachment of marine organisms. U.S. Pat. No. 5 298 060, for example, describes a system based on organosilicone liquids in combination with organosilicone polymers. The effectiveness of the biocide-free antifouling coatings, however, is limited, so that within relatively short periods of time it is still necessary to carry out mechanical cleaning of the ship's hull or of the underwater construction.

Also known are antifouling coating which comprise biocides (U.S. Pat. No. 4,769,398). The biocides kill the organisms which form the infestation. Common antifouling biocides are organotin compounds or else copper antimony and bismuth compounds. The disadvantage of these biocides is their poor environmental compatibility. Antifouling biocides which include heavy metals are particularly problematic since they cause contamination of the sea water and of the sea floor, especially in the area of harbours. The purely organic biocides which are also mentioned in U.S. Pat. No. 4,769,398, on the other hand, do not have a good long-term action, since apparently the active substance is degraded prematurely while still in the coating.

The object of the present invention is therefore to provide a highly effective antifouling coating which has good long-term action and improved environmental compatibility.

It has surprisingly now been found that antifouling coatings with heavy-metal-free biocides exhibit markedly improved antifouling properties in conjunction with a good long-term action and improved environmental compatibility if organopolysiloxanes are used as binders in the antifouling coating.

SUMMARY OF THE INVENTION

The invention therefore provides compositions comprising a) at least one organopolysiloxane and b) at least one heavy-metal-free biocide.

The good antifouling action of the novel combination of heavy-metal-free biocide and organopolysiloxane as binder in the antifouling coating of the invention is apparently induced by synergism between the biological action of the biocide and the physical action of the organopolysiloxane.

DETAILED DESCRIPTION OF THE INVENTION

The organopolysiloxanes which are preferably employed in accordance with the invention, such as silicone resins, silicone rubber systems, organomodified polysiloxanes such as polyethersiloxanes, epoxy- or amino-functional siloxanes and silicone acrylates and/or organosilicone copolymers, possess on the one hand an anti-adhesion effect owing to their hydrophobic surface. This reduces the infestation by algae, barnacles, tube worms, mussels or other marine organisms on the surface of ships' hulls and underwater constructions. At the same time the hydrophobic polymer matrix of the invention results in the heavy-metal-free biocides it contains having an improved long-term action. This relates in particular to the biocides employed in the preferred embodiment that are degradable in sea water.

In a particularly preferred embodiment of the invention, the long-term action is increased further by an additional microencapslation of the heavy-metal-free biocide.

Suitable biocides are preferably heavy-metal-free algicides, fungicides, insecticides, molluscicides and bactericides such as Triazoles
  azaconazole, bromuconazole, cyproconazole, dichlobutrazol, diniconazole, hexconazole, metconazole, penconazole, propiconazole, tebuconazole, amitrole, azocyclotin, epoxyconazole, bitertanol, difenoconazole, fenbuconazole, fenchlorazole, fenethanil, fluquinconazole, flusilazole, flutriafol, imibenconazole, isozofos, myclobutanil, paclobutrazol, (±-cis-1-(4-chlorophenyl)-2-(1H-1,2,4-triazol-1-yl)-cycloheptanol, tetraconazole, triadimefon, triadimenol, triapenthenol, triflumizole, triticonazole, uniconazole and their metal salts and acid adducts.

Imidazoles
  imazalil, pefurazoate, prochloraz, triflumizole.

Thiazolecarboxanilides such as 2',6'-dibromo-2-methyl-4-trifluoromethoxy4'-trifluoromethyl-1,3-thiazole-5-carboxanilide and their metal salts and acid adducts.

Succinate Dehydrogenase Inhibitors such as
  fenfuram, furcarbanil, cyclafluramid, furmecyclox, seedvax, metsulfovax, pyrocarbolid, oxycarboxin, Shirlan, mebenil (mepronil), benodanil, flutolanil (Moncut);

Naphthalene Derivatives such as
  terbinafine, naftifine, butenafine;
  sulfenamides such as dichlofluanid, tolylfluanid, folpet, fluorfolpet; captan, captofol;
  benzimidazoles such as carbendazim, benomyl, furathiocarb, fuberidazole, thiophonatmethyl, thiabendazole or salts thereof;
  morpholine derivatives such as tridemorph, fenpropimorph, falimorph, dimethomorph, dodemorph; aldimorph, fenpropidin and their salts with arylsulphonic acids, such as p-toluenesulphonic acid and p-dodecylphenyl-sulphonic acid;
dithiocarbamates, cufraneb, ferbam, mancopper, mancozeb, maneb, metam, metiram, thiram zeneb, ziram:
  Benzothiazoles such as 2-mercaptobenzothiazole;
  Benzamides such as 2,6-dichloro-N-(4-trifluoromethylbenzyl)-benzamide;
  Boron compounds such as boric acid, boric esters, borax;
formaldehyde and formaldehyde donor compounds such as benzyl alcohol mono-(poly)-hemiformal, oxazolidines, hexa-hydro-S-triazines, N-methylolchloracetamide, paraformadehyde, nitropyrine, oxolic acid, tecloftalam;

tris-N-(cyclohexyldiazeniumdioxy)-aluminium;
N-methylisothiazolin-3-one, 5-cloro-N-methylisothiazolin-3-one, 4,5-dichloro-N-octylisothiazolin-3-one, N-octyl-isothiazolin-3-one, 4,5-trimethylene-isothiazolinone, 4,5-benzisothiazolinone;

aldehydes such as cinnamaldehyde, formaldehyde, glutardialdehyde, β-bromo-cinnamaldehyde; thiocyanates such as thiocyanatomethylthiobenzothiazole, methylenebisthiocyanate, and the like;

quaternary ammonium compounds such as benzyldimethyltetradecylammonium chloride, benzyldimethyldodecylammonium chloride, didecyldimethylammonium chloride;

iodine derivatives such as diiodomethyl p-tolyl sulphone, 3-iodo-2-propinyl alcohol, 4-chlorophenyl-3-iodopropargyl formal, 3-bromo-2,3-diiodo-2-propenyl ethylcarbamate, 2,3,3-triiodoallyl alcohol, 3-bromo-2,3-diiodo-2-propenyl alcohol, 3-iodo-2-propinyl n-butylcarbamate, 3-iodo-2-propinyl-n-butylurea, 3-iodo-2-propinyl n-hexylcarbamate, 3-iodo-2-propinyl cyclohexylcarbamate, 3-iodo-2-propinyl phenylcarbamate;

phenol derivatives such as tribromophenol, tetrachlorophenol, 3-methyl-4-chlorophenol, 3,5-dimethyl-4-chlorophenol, phenoxyethanol, dichlorophen, o-phenylphenol, m-phenylphenol, p-phenylphenol, 2-benzyl-4-chlorophenol and their alkali metal salts and alkaline earth metal salts.

Microbicides having an activated halogen group such as chloroacetamide, N-methylolchloroacetamide, bronopol, bronidox, tectamer such as 2-bromo-2-nitro-1,3-propanediol, 2-bromo-4'-hydroxy-acetophenone, 2,2-dibromo-3-nitrilo-propionamide, 1,2-dibromo-2,4-dicyanobutane, β-bromo-β-nitrostyrene;

pyridines such as 1-hydroxy-2-pyridinethione (and the Na, Fe, Cu, Mn, Zn salts thereof), tetrachloro-4-methylsulphonylpyridine, pyrimethanol, mepanipyrim, dipyrithion;

dialkyldithiocarbamates such as Na salts of dialkyldithiocarbamates, tetramethylthiuram disulphide, potassium N-methyl-dithiocarbamate;

nitriles such as 2,4,5,6-tetrachloroisophthalonitrile, disodium cyanodithioimidocarbamate;

quinolines such as 8-hydroxyquinoline and the Cu salts thereof;

mucochloric acid, 5-hydroxy-2(5H)-furanone;

4,5-dichlorodithiazolinone, 4,5-benzodithiazolinone, 4,5-trimethylenedithiazolinone, 4,5-dichloro-(3H)-1,2-dithiol-3-one, 3,5-dimethyl-tetrahydro-1,3,5-thiadiazine-2-thione, N-(2-p-chlorobenzoylethyl)-hexaminium chloride, potassium N-hydroxymethyl-N'-methyl-dithiocarbamate, 2-oxo-2-(4-hydroxy-phenyl)acethydroximic acid chloride, phenyl 2-chloro-cyano-vinyl sulphone, phenyl 1,2-dichloro-2-cyano-vinyl sulphone;

Furthermore, highly effective compositions are also prepared with the following active substances:

Fungicides methyl (E)-methoximino[α-(o-tolyloxy)-o-tolyl]acetate, methyl (E)-2-{2-[6-(2-cyanophenoxy)-pyrimidin-4-yloxy]phenyl}-3-methoxyacrylate, acypetacs, 2-aminobutane, ampropylfos, anilazine, benalaxyl, bupirimate, chinomethionat, chloroneb, chlozolinate, cymoxanil, dazomet, diclomezine, dichloram, diethofencarb, dimethirimol, diocab, dithianon, dodine, drazoxolon, edifenphos, ethirimol, etridiazole, fenarimol, fenitropan, fentin acetate, fentin hydroxide, ferimzone, fluazinam, fluromide, flusulfamide, flutriafol, fosetyl, fthalide, furalaxyl, guazatine, hymexazol, iprobenfos, iprodione, isoprothiolane, metalaxyl, methasulfocarb, nitrothal-isopropyl, nuarimol, ofurace, oxadiyl, perflurazoate, pencycuron, phosdiphen, pimaricin, piperalin, procymidone, propamocarb, propineb, pyrazophos, pyrifenox, pyroquilon, quintozene, tar oils, tecnazene, thicyofen, thiophanate-methyl, tolclofos-methyl, triazoxide, trichlamide, tricyclazole, triforine, vinclozolin.

Insecticides phosphates such as azinphos-ethyl, azinphos-methyl, α-1 (4-chlorophenyl)-4-(O-ethyl, S-propyl)phosphoryloxy-pyrazole, chlorpyrifos, coumaphos, demeton, demeton-S-methyl, diazinon, dichlorvos, dimethoate, ethoate, ethoprophos, etrimfos, fenitrothion, fenthion, heptenophas, parathion, parathion-methyl, phosalone, phoxim, pirimiphos-ethyl, pirimiphos-methyl, profenofos, prothiofos, sulfprofos, triazophos and trichlorphon;

carbamates such as aldicarb, bendiocarb, α-2-(1-methylpropyl)-phenyl methylcarbamate, butocarboxim, butoxycarboxim, carbaryl, carbofuran, carbosulfan, cloethocarb, isoprocarb, methomyl, oxamyl, pirimicarb, promecarb, propoxur and thiodicarb;

organosilicon compounds, preferably dimethyl(phenyl) silyl-methyl 3-phenoxybenzyl ethers such as dimethyl-(4-ethoxyphenyl)-silylmethyl 3-phenoxybenzyl ether or (dimethylphenyl)-silyl-methyl 2-phenoxy-6-pyridylmethyl ethers such as e.g. dimethyl-(9-ethoxy-phenyl)-silylmethyl 2-phenoxy-6-pyridylmethyl ether or [(phenyl)-3-(3-phenoxyphenyl)-propyl](dimethyl)-silanes such as e.g. (4-ethoxyphenyl)-[3-(4-fluoro-3-phenoxyphenyl-propyl]dimethyl-silane, silafluofen;

pyrethroids such as allethrin, alphametbrin, bioresmethrin, byfenthrin, cycloprothrin, cyfluthrin, decamethrin, cyhalothrin, cypermethrin, deltamethrin, alpha-cyano-3-phenyl-2-methylbenzyl-2,2-dimethyl-3-(2-chloro-2-trifluoro-methylvinyl) cyclopropanecarboxylate, fenpropathrin, fenfluthrin, fenvalerate, flucythrinate, flumethrin, fluvalinate, permethrin, resmethrin and tralomethrin;

nitroimines and nitromethylenes such as 1-[(6-chloro-3-pyridinyl)-methyl]4,5-dihydro-N-nitro-1H-imidazole-2-amine (imidacloprid), N-[(6-chloro-3-pyridyl) methyl-]$N^2$-cyano-$N^1$-methylacetamide (NI-25);

abamectin, AC 303, 630, acephate, acrinathrin, alanycarb, aldoxycarb, aldrin, amitraz, azamethiphos, Bacillus thuringiensis, phosmet, phosphamidon, phosphine, prallethrin, propaphos, propetamphos, prothoate, pyraclofos, pyrethrins, pyridaben, pyridafenthion, pyriproxyfen, quinalphos, RH-7988, rotenone, sodium fluoride, sodium hexafluorosilicate, sulfotep, sulphuryl fluoride, tar oils, teflubenzuron, tefluthrin, temephos, terbufos, tetrachlorvinphos, tetramethrin, O-2-tert.-butyl-pyrimidin-5-yl-o-isopropyl-phosphorothiate, thiocyclam, thiofanox, thiometon, tralomethrin, triflumuron, trimethacarb, vamidothion, Verticillium Lacanii, XMC, xylylcarb, benfuracarb, bensultap, bifenthrin, bioallethrin, MERbioallethrin (S)-cyclopentenyl isomer, bromophos, bromophos-ethyl, buprofezin, cadusafos, calcium polysulphide, carbophenothion, cartap, chinomethionat, chlordane, chlorfenvinphos, chlorfluazuron, chlormephos, chloropicrin, chlorpyrifos, cyanophos, beta-cyfluthrin, alpha-cypermethrin, cyophenothrin, cyromazine, dazomet, DDT, demeton-S-methylsulphon, diafenthiuron, dialifos, dicrotophos, diflubenzuron, dinoseb, deoxabenzofos, diaxacarb, disulfoton, DNOC, empenthrin, endosulfan, EPN, esfenvalerate, ethiofencarb, ethion, etofenprox, fenobucarb, fenoxycarb, fensulfothion, fipronil, flucycloxuron, flufenprox, flufenoxuron, fonofos, formetanate, formothion, fosmethilan, furathiocarb, heptachlor, hexaflumuron, hydramethylnon, hydrogen cyanide, hydroprene, IPSP, isazofos, isofenphos, isoprothiolane, isoxathion, iodfenphos, kadethrin, lindane, malathion, mecarbam, mephosfolan, mercurous, chloride, metam, Metarthizium, anisopliae, methacrifos, methamidophos, methidathion, methiocarb, methoprene, methoxychlor, methyl isothiocyanate, metholcarb, mevinphos, monocrotophos, naled, Neodiprion sertifer NPV, nicotine, omethoate, oxydemeton-methyl, pentachlorophenol, petroleum oils, phenothrin, phenthoate, phorate;

Molluscicides fentin acetate, metaldehyde, methiocarb. niclosamide, thiodicarb, trimethacarb;

Algicides dichlororphen, endothal, fentin acetate, quinoclamine;

Herbicides diuron, dichlorophen, endothal, fentinacet, quinochlamine.

Suitable biocides are preferably algicides such as diuron, dichlorophen, endothal, fentin acetate, quinoclamine, molluscicides such as fentin acetate, metaldehyde, methiocarb, niclosamide, thiodicarb and trimethacarb, fungicides such as dichlo-fluanid, tolylfluanid, iodopropargyl butylcarbamate, fluorfolpet and azoles such as tebuconazole or customary antifouling active substances such as 2-(N,N-dimethylthiocarbamoylthio)-5-nitrothiazyl, tetrabutyldistannoxane, 2-tert-butylamino-4-cyclopropylamino-6-methylthio-1,3,5-triazine, 4,5-dichloro-2-n-octyl-4-isothiazolin-3-one, 2,4,5,6-tetrachloroisophthalodinitrile, tetramethylthiuram disulphide, 2,4,6-trichlorophenylmaleimide, 2,3,5,6-tetrachloro-4-(methylsulphonyl)-pyridine, diiodomethyl paratryl sulphone, thiabendazole, tetraphenylboron pyridine salt, sodium salt of 2-pyridinethiol 1-oxide.

Other biocides preferred in accordance with the invention are benzothiophene-2-carboxamide S,S-dioxides of the formula (I)

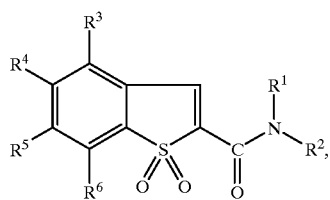

(I)

in which

R¹ represents optionally substituted alkyl, represents alkenyl or alkinyl, represents in each case optionally substituted cycloalkyl or cycloalkylalkyl, or represents in each case optionally substituted aralkyl, aralkenyl, aralkinyl or aryl, R² represents hydrogen or represents optionally substituted alkyl or R¹ and R² together with the nitrogen atom to which they are attached represent an optionally substituted heterocycle and R³, R⁴, R⁵ and R⁶ independently of one another each represent hydrogen, halogen, cyano, nitro, alkyl, alkoxy, alkylthio, halogenoalkyl, halogenoalkoxy or halogenoalkylthio.

Particular preference is given to the compound N-cyclohexylbenzothiophene-2-carboxamide S,S-dioxide.

Particularly good effects are also obtained with active-substance combinations preferably of the specified biocides.

Particular preference is given to those biocides which are degradable.

The term degradable for the purposes of the invention is used for those biocides which have a half-life in sea water at 25° C. of less [lacuna] 180 days, preferably less than 90 days. The mechanism of the degradation reaction is not critical for the inventive effect. It may be chemical degradation by, for example, hydrolysis or oxidation, photochemical degradation, or biological degradation by microorganisms.

Examples of suitable degradable active substances can be found, for example, within the group of the phenoxyacetic acids, ureas, thioureas, thiocarbamates, sulphamides and halogenoaromatic compounds.

Preferred biocides are:

Diuron     3-(3,4-Dichlorophenyl)-1,1-dimethylurea

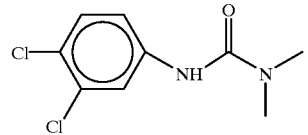

Triflumuron     1-(2-Chlorobenzoyl)-3-(4-trifluoromethoxyphenyl)urea

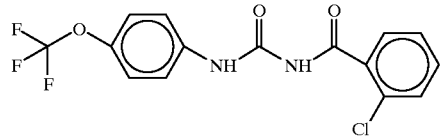

Dichlofluanid     N-Dichlorofluoromethanesulphenyl-N',N'-dimethyl-N-phenylsulphainide

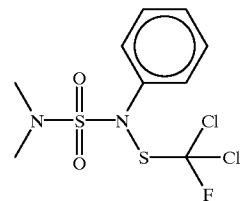

Tolylfluanid     N-Dichlorofluoromethanesulphenyl-N',N'-dimethyl-N-phenylsulphamide

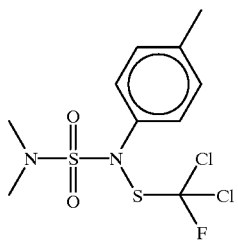

Fluorfolpet  N-(Fluorodichloromethylthiophthalimide)

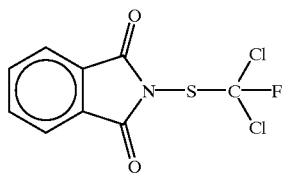

Dichlobenil  2,6-Dichlorobenzonitrile

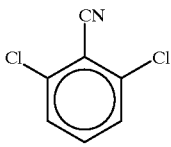

The long-term action of the biocides is preferably reinforced by means of microencapsulation. Suitable materials for the microencapsulation of the biocides are the materials known for this purpose, especially polymers. Examples of suitable polymers are polyesters, natural and synthetic polyamides, melamine resins, polyurethanes, polyureas, polysiloxanes, poly(meth)acrylates, and copolymers of (meth)acrylic acid and (meth)acrylic ester. In many cases it is advantageous to employ crosslinked polymers. As a natural polyamide, gelatine is particularly suitable. It is employed in particular as the coacervate and complex coacervate. Gelatine-containing compex coacervates for the purposes of the invention are, in particular, combinations of gelatine and synthetic polyelectrolytes. Suitable synthetic polyelectrolytes are copolymers with incorporated units of, for example, maleic acid, acrylic acid, methacrylic acid, acrylamide and methacrylamide. Gelatine-containing capsules can be crosslinked with customary curing agents such as, for example, formaldehyde or glutaraldehyde.

The microencapsulated biocide can in the form of a single biocide particle enveloped by a polymer shell. Alternatively, there may be a polymer particle in which a large number of biocide particles are enclosed or in which the biocide is present in molecularly disperse form. The microencapsulation of isolated biocide particles can be carried out by known methods, for example by applying a finished polymer from solution by precipitating the polymer or evaporating the solvent. It is also possible to produce the polymer on the surface of the biocide particle by means of assembly reactions, such as addition polymerization, polyaddition or polycondensation.

The preparation of polymer particles comprising a large number of enclosed biocide particles can be carried out, for example, by melt compounding with subsequent comminution. Another very suitable process for preparing biocide-containing polymer particles is bead addition polymerization. In this procedure, liquid mixtures of monomers and biocide are broken up into small droplets and cured, giving spherical particles in which the active substance is enclosed. Suitable monomers for preparing biocide-containing bead addition polymers are, for example, the following monofunctional monomers and multifunctional monomers, which generally act as crosslinkers: styrene, vinyltoluene, chlorostyrene, chloromethylstyrene, acrylic acid, methacrylic acid, acrylates, methacrylates, acrylonitrile, methacrylonitrile, acrylamide, methacrylamide, vinyl chloride, vinylidene chloride, vinyl acetate, divinylbenzene, diethylene glycol divinyl ether, 1,7-octadiene, 1,5-hexadiene, ethylene glycol dimethacrylate, triethylene glycol dimethacrylate, trimethylolpropane trimethachrylate and allyl methacrylate.

It has been found that antifouling coatings with bead addition polymers comprising active substance permit high filling levels and have very good processing properties.

The average particle size of the microencapsulated biocides is from 0.1 to 200 μm, preferably from 0.2 to 20 μm. The proportion of the biocides, in microencapsulated form or otherwise, is from 1 to 50, preferably from 2 to 40% by weight, based on the antifouling coating.

Binders employed for the antifouling coating of the invention are at least one organopolysiloxane such as silicone resins, silicone rubber systems, organomodified polysiloxanes such as polyethersiloxanes, epoxy- or amino-functional siloxanes and silicone acrylates and also organosilicon copolymers. However, it is also possible to employ mixtures of the specified polysiloxanes.

Silicone resins employed are physically drying silicone resins of high molecular mass, of the general formula (1)

$$R^1_a(R^2O)_b\mathrm{Si(O)}_{\frac{(4-(a+b))}{2}}, \qquad (1)$$

where
  $R^1$ represents a monovalent hydrocarbon radical having 1–14 carbon atoms, which may carry substituents that are inert towards water
  $R^2$ represents a monovalent hydrocarbon radical having 1–5 carbon atoms
  a is 0, 1, 2 or 3, on average 0.75–1.5, and
  b is 0, 1, 2, 3, on average 0.01–0.1.

Likewise employed are low molecular mass alkoxy-functional silicone resins of the general formula (2)

$$R^3_x(R^4O)_y\mathrm{Si(O)}_{\frac{(4-(x+y))}{2}}, \qquad (2)$$

where
  $R^3$ represents a monovalent hydrocarbon radical having 1–14 carbon atoms, which may carry substituents that are inert towards water
  $R^4$ represents a monovalent hydrocarbon radical having 1–5 carbon atoms
  x is 0, 1, 2 or 3, on average 0.75–1.5, and
  b is 0, 1, 2, 3, on average 0.2–2.0 and mixtures of high molecular mass silicone resins and low molecular mass alkoxy-functional silicone resins.

Silicone rubber systems used are all prior art condensation-crosslinking or addition-crosslinking systems such as room temperature-crosslinking one- or two-component rubbers or vulcanizable two-component liquid rubber. The composition of the silicone rubbers which can be employed in accordance with the invention is described, for example, in "Ullmann's Encyclopedia of Industrial Chemistry, Vol. A23, 306 ff".

Organomodified polysiloxanes can be linear or branched polysiloxanes, it being possible for the organofunctional radical or radicals to be arranged terminally and/or laterally.

The binders are generally processed from organic solvents or as an aqueous dispersion. Examples of suitable organic solvents are aliphatic hydrocarbons, especially petroleum fractions, aromatic hydrocarbons, halogenated hydrocarbons, alcohols, ketones, esters and ethers.

In addition to the heavy-metal-free biocides and the organopolysiloxanes, the antifouling coating compositions of the invention may include customary auxiliaries such as, for example, fillers, solvents, plasticizers, dyes, pigments, catalysts, inhibitors, tackifiers, coatings additives and/or common dispersing or formulating auxiliaries. In addition to the heavy-metal-free biocides it is also possible, of course, for heavy-metal-containing biocides to be present as well such as, for example, N-(cyclo-hexyldiazeniumdioxy)-tributyltin or K salts, bis-N-(cyclohexyldiazeniumdioxy)-copper; metal soaps such as tin, copper and zinc naphthenate, octoate, 2-ethylhexanoate, oleate, phosphate and benzoate, metal salts such as copper hydroxycarbonate, sodium dichromate, potassium dichromate, potassium chromate, copper sulphate, copper chloride, copper borate, zinc fluorosilicate, copper fluorosilicate, oxides such as tributyltin oxide, $Cu_2O$, CuO and ZnO; Ag, Zn or Cu-containing zeolites alone or enclosed in polymeric active substances, although in this case the ecological advantage is limited.

The examples which follow are intended to illustrate the invention. However, the invention is not limited to All references to parts and percentages are by weight unless otherwise indicated. the examples.

EXAMPLES

Example 1
Microencapslation of Diuron (Envelopment)

The following ingredients were weighed out into a bead mill:

12 g of diuron, 0.06 g of dispersant (Baykanol SI, Bayer AG), 48 g of a 5% strength, aqueous alkaline solution of a terpolymer of 24% by weight methacrylic acid, 36% by weight methacrylate and 40% by weight butyl acrylate, and 10 g of water.

The mixture was shaken for 20 h, during which the diuron particles were reduced to a size of from 0.5 to 1.0 μm. The mixture was subsequently acidified with 15 ml of 1N HCl, and heated at 60° C. for 1 h, and the solid was filtered off, washed with 30 ml of water and dried in vacuo at 60° C. This gave 14.2 g of microencapsulated diuron.

Example 2
Microencapsulation of Diuron (Bead Polymerization)

In a ball mill, 100 g of diuron, 30 g of highly disperse silica (HDK H 2000), Wacker Chemie GmbH), 285 g of methyl methacrylate and 15 g of ethylene glycol dimethacrylate were mixed thoroughly at room temperature for 10 h. Subsequently, 3 g of dibenzoyl peroxide were added and the mixture obtained was transferred to a 3l stirred reactor containing 1.5l of a 1% strength aqueous alkaline solution (adjusted to a pH of 0.8 with NaOH) of a copolymer of 50% by weight methacrylic acid and 50% by weight methyl methacrylate. The stirring speed was set at 600 rpm and the temperature was held at 78° C. for 2 h and then at 85° C. for 1 h. After cooling, the solid obtained was isolated by decanting, washed a number of times with water and dried at 80° C. for 12 h. This gave 385 g of microencapsulated diuron in the form of bead addition polymers having an average particle size of 15 μm.

Example 3
Microencapsulation of Alsystin (Envelopment)

Example 1 was repeated using alsystin instead of diuron. 13.5 g of microencapsulated alsystin were obtained.

Example 4
Coating in Accordance with the Invention 2 g of a dispersion consisting of 50% by weight diuron and 50% by weight Isopar G were dispersed in 11.67 g of a silicone resin solution having a viscosity of 3000 mPas and consisting of 77.1% by weight of a physically drying organopolysiloxane of high molecular mass and 22.9% by weight Isopar G, dispersion being carried out with the aid of a high-speed stirrer. With the aid of a doctor blade, the dispersion was applied in a wet film thickness of 250 μm to a metal plate coated [lacuna] epoxy lacquer. The coating was dried at 60° C. for 10 h. This gave a homogeneous coating having a coat thickness of about 150 μm.

Example 5
Coating in Accordance with the Invention

Same procedure as in Example 4. However, a dispersion of 50% by weight alsystin in Isopar G was incorporated.

Example 6
Coating in Accordance with the Invention 3 g of a dispersion consisting of 33% by weight of the diuron microencapsulated in Example 2 and 77% by weight Isopar G were dispersed in 11.67 g of a silicone resin solution having a viscosity of 3000 mPas and consisting of 77.1% by weight of a physically drying organopolysiloxane of high molecular mass and 22.9% by weight Isopar G, dispersion being carried out with the aid of a high-speed stirrer. With the aid of a doctor blade, the dispersion was applied in a wet film thickness of 250 μm to a metal plate coated [lacuna] epoxy lacquer. The coating was dried at 60° C. for 10 h. This gave a homogeneous coating having a coat thickness of about 150 μm.

Example 7
Coating in Accordance with the Invention 11.67 g of a silicone resin solution having a viscosity of 3000 mPas and consisting of 77.1% by weight of a physically drying organopolysiloxane of high molecular mass and 22.9% by weight of Isopar G was diluted with 4 g of Isopar G. 1 g of the diuron microencapsulated in Example 1 were dispersed in this solution with the aid of a high-speed stirrer. With the aid of a doctor blade, the dispersion was applied in a wet film thickness of 250 μm to a metal plate coated [lacuna] epoxy lacquer. The coating was dried at 60° C. for 10 h. This gave a homogeneous coating having a coat thickness of about 150 μm.

Example 8
Coating in Accordance with the Invention

Same procedure as Example 7. However, 1 g of the alsystin microencapsulated in Example 3 was dispersed in the dilute silicone resin solution.

Example 9
Coating in Accordance with the Invention

Same procedure as Example 7. However, a mixture consisting of 0.5 g of the diuron microencapsulated in Example 1 and 0.5 g of the alsystin microencapsulated in Example 3 was dispersed in the dilute silicone resin solution.

Example 10

Comparative Example 11.67 g of silicone resin solution having a viscosity of 3000 mPas and consisting of 77.1% by weight of a physically drying organopolysiloxane of high molecular mass and 22.9% by weight Isopar G was diluted with 4 g of Isopar G. With the aid of a doctor blade, the resin solution was applied in a wet film thickness of 250 μm to a metal plate coated [(lacuna] epoxy lacquer. The coating was dried at 60° C. for 10 h. This gave a homogeneous coating having a coat thickness of about 150 μm.

Example 11
Coating in Accordance with the Invention 6 g of diuron, 1.8 g of Baysilone® coatings additive PL (obtainable from Bayer AG) and 0.12 g of Baysilone® coatings additive experimental product Al 3465 (obtainable from Bayer AG) were dispersed in 26.7 g of an OH-functional polyoxyalkylene-polynethylsiloxane copolymer with the aid of a high-speed stirrer. The dispersion was admixed with 27.3 g of polyisocyanate prepolymer (Desmodur E 21, obtainable from Bayer AG) and, with the aid of a doctor blade, was applied in a wet film thickness of 250 μm to a metal plate coated [lacuna] epoxy lacquer. The coating was dried at room temperature. This gave a homogeneous coating having a coat thickness of about 250 μm.

Example 12
Coating in Accordance with the Invention

Same procedure as in Example 11. However, the biocide employed was 6.0 g of alsystin.

Example 13
Coating in Accordance with the Invention

Same procedure as in Example 11. However, the biocide employed was 6.0 g of the diuron microencapsulated in Example 2.

Example 14
Coating in Accordance with the Invention

Same procedure as in Example 11. However, the biocide employed was 6.0 g of the alsystin microencapsulated in Example 3.

Example 15

Comparative Example

Same procedure as in Example 11. However, no biocide was employed.

Example 16
Coating in Accordance with the Invention 3 g of diuron were dispersed in 27 g of a linear α,ω-dihydroxypolydimethylsiloxane having a viscosity of about 500 mPas with the aid of a high-speed stirrer. The dispersion was admixed with 0.81 [lacuna] of crosslinker C5 (obtainable from Bayer AG) and, with the aid of a doctor blade, was applied in a wet film thickness of 250 μm to a metal plate coated [lacuna] epoxy lacquer. The coating was dried at room temperature. This gave a homogeneous coating having a coat thickness of about 250 μm.

Example 17
Coating in Accordance with the Invention

Same procedure as in Example 16. However, the biocide employed was 6.0 g of alsystin.

Example 18
Coating in Accordance with the Invention

Same procedure as in Example 16. However, the biocide employed was 3 g of the diuron microencapsulated in Example 2.

Example 19
Coating in Accordance with the Invention

Same procedure as in Example 16. However, the biocide employed was 3 g of the alsystin microencapsulated in Example 3.

Example 20

Comparative Example

Same procedure as in Example 16. However, no biocide was employed.

Example 21
Coating in Accordance with the Invention 3 g of diuron are dispersed in 27 g of a vinyl-functional polymethylsiloxane mixture (Silopren® U basic mixture H6, obtainable from Bayer AG) with the aid of a high-speed stirrer. The dispersion was admixed with 1.81 g of an SiH-containing crosslinker (Silopren® U crosslinker 830, obtainable from Bayer AG) and 0.027 g of a Pt catalyst (Silopren® U catalyst Pt/S. obtainable from Bayer AG) and, with the aid of a doctor blade, was applied in a wet film thickness of 250 μm to a metal plate coated [lacuna] epoxy lacquer. The coating was dried at room temperature. This gave a homogeneous coating having a coat thickness of about 250 μm.

Example 22
Coating in Accordance with the Invention

Same procedure as in Example 21. However, the biocide employed was 3 g of alsystin.

Example 23
Coating in Accordance with the Invention

Same procedure as in Example 21. However, the biocide employed was 3 g of the diuron microencapsulated in Example 2.

Example 24
Coating in Accordance with the Invention

Same procedure as in Example 21. However, the biocide employed was 3 g of the alsystin microencapsulated in Example 3.

Example 25

Comparative Example

Same procedure as in Example 21. However, no biocide was employed.

Example 26
Coating in Accordance with the Invention 2 g of alsystin were dispersed in 30.2 g of a solution of a silicone-acrylate-copolymer (Baysilone® impregnating agent LF, obtainable from Bayer AG) with the aid of a high-speed stirrer. With the aid of a doctor blade, the dispersion was applied in a wet film thickness of 250 μm to a metal plate coated [lacuna] epoxy lacquer. The coating was dried at room temperature. This gave a homogeneous coating having a coat thickness of about 155 μm.

Example 27

Coating in Accordance with the Invention

Same procedure as in Example 26. However, the biocide employed was 2 g of the alsystin microencapsulated in Example 3.

Example 28

Comparative Example

Same procedure as in Example 21. However, no biocide was employed.

Use Examples 29–33 for Testing the Attachment of Benthic Diatom Algae (Nitzschia Pusilla) to Coatings in Accordance with the Invention

| | |
|---|---|
| Test organism: | Diatom alga Nitzschia (benthic diatom alga) |
| Medium: | ASW medium |
| Culture vessels: | Erlenmeyer culture flasks |
| Test conditions: | Temperature: 18° C., permanent artificial light, permanent movement on a tumble shaker, without additional aeration. |
| Evaluation: | Comparison of the coatings in accordance with the invention with respect to infestation with Comparative Example 10 and a metal plate coated with epoxy lacquer. The degree of infestation is scored as follows: +++: good, uniform infestation; ++: low infestation; +: very low infestation; −: no infestation |

| Example | | Infestion after 14 days |
|---|---|---|
| 29 | 14 days' exposure of the coating in accordance with the invention from Example 4 under above test conditions | + |
| 30 | as Example 29 but with coating in accordance with the invention from Example 5 | + |
| 31 | as Example 29 but with coating in accordance with the invention from Example 9 | − |
| 32 | as Example 29 but with coating from Example 10 (comparative example) | ++ |
| 33 | metal plate coated with epoxy lacquer | +++ |

Result of the Use Examples

The coating in accordance with the invention from Example 4 contained an organopolysiloxane as binder and diuron as degradable biocide. After 14 days' exposure of this coating with benthic diatom algae at 18° C., permanent artificial light permanent movement and without additional aeration, only very low infestation (+) was present.

The coating in accordance with the invention from Example 5 likewise showed only very low infestation (+) in Example 30. It contained an organopolysiloxane as binder and alsystin as degradable biocide.

No infestation (−) under the stated test conditions were shown by the coating in accordance with the invention from Example 9n. It likewise contained an organopolysiloxane as binder and, as degradable biocides, a mixture of microencapsulated diuron and microencapsulated alsystin. This is surprising insofar as the biocides were microencapsulated in order to achieve a good long-term effect.

The coating from Comparative Example 10 was biocide-free. The binder was an organopolysiloxane. This coating, in Example 32, showed low infestation (++). A metal plate coated with an epoxy lacquer, on the other hand, show good, uniform infestation (+++) in Example 33.

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. Composition comprising a) at least one organopolysiloxane and b) at least one microencapsulated heavy-metal-free biocide.

2. Composition according to claim 1, wherein the biocides are degradable in sea water.

3. Composition according to claim 2, wherein the biocides have a half-life in sea water at 25° C. of less than 180 days.

4. Composition according to claim 1, wherein the organopolysiloxane is a high molecular mass silicone resin of the formula $$R^1_a(R^2O)_bSi(O)_{\frac{(4-(a+b))}{2}},$$

wherein $R^1$ represents a monovalent hydrocarbon radical having 1–14 carbon atoms, which may carry substituents that are inert towards water, $R^2$ represents a monovalent hydrocarbon radical having 1–5 carbon atoms, a=0, 1, 2 or 3, on average 0.75–1.5, and b=0, 1, 2, 3, on average 0.01–0.1.

5. Composition according to claim 1, wherein the organopolysiloxane is a low molecular mass alkoxy-functional silicone resin of the formula $$R^3_x(R^4O)_ySi(O)_{\frac{(4-(x+y))}{2}},$$

wherein $R^3$ represents a monovalent hydrocarbon radical having 1–14 carbon atoms, which may carry substituents that are inert towards water, $R^4$ represents a monovalent hydrocarbon radical having 1–5 carbon atoms, x=0, 1, 2 or 3, on average 0.75–1.5, and y=0, 1, 2, 3, on average 0.2–2.0.

6. Composition according to claim 1, wherein the organopolysiloxane is a silicone rubber.

7. Composition according to claim 1, wherein the organopolysiloxane comprises terminal and/or lateral organofunctional radicals.

8. Composition according to claim 1, wherein the organopolysiloxane is an organosilicon copolymer system.-

9. Composition according to claim 1 wherein the compositions additionally comprise inorganic pigments, organic pigments, dyes, which are preferably insoluble in sea water, and/or customary auxiliaries such as fillers, solvents, plasticizers, catalysts, inhibitors, tackifiers, coatings additives and/or common dispersing auxiliaries.

10. Process for preparing antifouling compositions, wherein the constituents which can be used for antifouling compositions are admixed with a) at least one organopolysiloxane and b) at least one heavy-metal-free biocide.

11. Process for producing antifouling coatings, wherein a composition comprising at least one organopolysiloxane and at least one heavy-metal-free biocide is applied to the articles that are to be protected.

12. Composition according to claim 1 wherein the biocide is an algicide, fungicide, insecticide, molluscicide, or bactericide.

* * * * *